United States Patent [19]

Conner et al.

[11] Patent Number: 5,742,438

[45] Date of Patent: Apr. 21, 1998

[54] PROJECTION ILLUMINATION SYSTEM

[75] Inventors: Arlie R. Conner, Tualatin; Jonathan R. Biles, Portland; David K. Booth, Tigard, all of Oreg.

[73] Assignee: In Focus Systems, Inc., Wilsonville, Oreg.

[21] Appl. No.: 307,223

[22] Filed: Sep. 16, 1994

[51] Int. Cl.$^6$ ................................................ G02B 3/08
[52] U.S. Cl. .................................... 359/743; 359/742
[58] Field of Search ............................... 359/742, 743

[56] References Cited

U.S. PATENT DOCUMENTS

| | | | |
|---|---|---|---|
| 4,577,260 | 3/1986 | Tysoe | 362/61 |
| 4,787,722 | 11/1988 | Claytor | 359/742 |
| 5,355,187 | 10/1994 | Ogino et al. | 353/38 |

Primary Examiner—Scott J. Sugarman
Attorney, Agent, or Firm—Stoel Rives LLP

[57] ABSTRACT

A projection system includes a collection lens that minimizes apparent magnification of the light source, so that the resulting system more nearly conforms to a point source idealization. Attendant benefits include improved collimation, a smaller projection lens, and a greater depth of focus. The collection lens is desirably of a "wrap around" configuration to maximize light collection while contributing to reduced source magnification. The opposite side of the collection lens can be provided with a convex lens of Fresnel form. Use of the Fresnel optic moves the principal plane of the collection lens closer to the light source, further minimizing the source's apparent magnification. The projection system additionally includes condensing optics formed with a deliberate asymmetry so as to provide more uniform illumination of a rectangular image plane. The Fresnel surface of the collection lens can be designed to provide this asymmetry.

22 Claims, 5 Drawing Sheets 5,742,438

PROJECTION ILLUMINATION SYSTEM

FIELD OF THE INVENTION

The present invention relates to illumination systems, and more particularly relates to illumination systems for LCD projectors and other applications requiring high collection efficiency and/or collimated illumination of a relatively thick image plane.

BACKGROUND AND SUMMARY OF THE INVENTION

Projection illumination systems typically comprise a reflector, a light source, a condenser lens, an image plane or stage (e.g. for film or LCD), and a projection lens. This basic arrangement is often termed a Köhler illumination system.

Difficulties arise in use of this basic system in certain applications, such as with electronic transparencies. In an electronic transparency, an LCD is positioned on the stage and is controlled by computer signals applied thereto. To generate colored images, a stack of three LCDs operated in tandem may be used (as shown in U.S. Pat. Nos. 4,917,465 and 5,050,965, incorporated herein by reference). Alternatively, a single panel with mosaically colored pixels (i.e. a mosaic filter) can be used.

Unlike film and other conventional image media, the transmissivity of LCDs is generally substantially less than fifty percent. (The polarizers used with most LCD displays effect a 66% attenuation of incident light; a further reduction is due to the substantial percentage of LCD surface area not dedicated to passage of light—so-called "aperture loss.") In color systems these and other inefficiencies are compounded, resulting in transmissivities on the order of 5%. Thus, for a given screen brightness, an electronic transparency requires a light source at least twice as bright as that for other projection systems, with still brighter sources required for color displays. With this increased light requirement comes increased heat. These factors increase the cost and complexity of electronic transparency projection systems.

The thickness of stacked LCDs in color display systems presents other difficulties. The illumination must be highly collimated as it passes through the three successive layers in order to avoid parallax effects. However, collimation becomes increasingly difficult as the physical size of the light source increases. It will be recognized that the increased illumination requirements associated with LCD projectors necessarily entail physically larger light sources, aggravating the parallax problem.

The larger light sources required for LCD projectors introduce other difficulties as well. The larger the light source, the larger the projection lens must be. Further, as the size of the light source is increased, the less the system conforms to a classical "point source" model, with a corresponding degradation in projected image quality. One way in which this degradation is manifested (besides the reduction in the depth of focus of the projected image) is in reduced contrast. (Further, the contrast of an LCD may itself depend on the viewing angle. In the case of a projector, to maximize contrast ratio it is desirable to restrict the angles of incidence to ±10° for most LCDs.)

Another degradation mechanism is the large relative aperture (i.e. low F/#) of lenses typically used with large light sources. Such lenses generally have less ideal imaging characteristics than desired.

As LCD size is reduced, the large light requirement becomes even more troublesome. It is widely held that illumination of a one inch (diagonal) LCD requires a light source with an arc gap ≦1 millimeter.

Still other complications arise in projection systems—not particular to electronic transparencies. More light is incident at the center of the image plane than at its periphery due to path length differences. Further, the medium being imaged is typically rectangular in shape, additionally complicating the goal of providing uniform illumination.

U.S. Pat. No. 5,092,672 assigned to 3M shows a prior art LCD projector that addresses some of these issues. Adjacent the lamp, the 3M projector uses a multi-element condenser system consisting of a spherical meniscus lens and a plano-convex spherical lens. These elements introduce a spherical aberration that makes the radial distribution of light at the LCD stage more nearly uniform. At the stage, the 3M system provides a Fresnel doublet to correct for the spherical aberration and to image the light source at the entrance of a projection lens located on the other side of the stage.

While the 3M system succeeds in addressing certain of the issues associated with LCD projection systems, it ignores or aggravates others. For example, the 3M system fails to account for the rectangular aspect ratio of LCD panels, and thus directs substantial illumination outside the actual image area.

The parallax problem has been addressed in prior art LCD projection systems by positioning a collimating Fresnel lens adjacent the LCD panel, as disclosed in U.S. Pat. No. 4,917,465 to Conner et al. However, the collimation thereby achieved is still impaired by the apparent angular extent of the light source as imaged through the condenser lens.

From the foregoing, it will be recognized that the design of projection systems—particularly for electronic transparencies—is not a simple task and can involve many competing considerations.

In accordance the present invention, an illumination system is provided which offers important improvements over the prior art. A preferred embodiment includes a meniscus-shaped collection lens positioned adjacent the light source. The side of the lens away from the light source is shaped in Fresnel form to realize a convex optic.

This foregoing arrangement has a number of advantages. One of the most important is that magnification of the light source size is thereby minimized. This is achieved, in part, by the meniscus shape of the collection lens, which permits it to be positioned closer to the source than would otherwise be possible. Reduced magnification of the source is also aided by the Fresnel optic. Use of a Fresnel optic moves the principal plane of the collection lens assembly closer to the light source, further minimizing the source's apparent magnification.

By reducing the source magnification, the resulting system more nearly conforms to the point source idealization. Attendant benefits include improved collimation, a smaller projection lens, and a greater depth of focus.

In a further aspect of the preferred embodiment, the illumination system includes a condenser assembly that is formed with a deliberate asymmetry so as to generally correspond with the aspect ratio of the LCD panel. (The condenser assembly usually includes the above-noted Fresnel optic.) This asymmetry serves to redirect the LCD illumination so as to achieve a generally uniform distribution of light at all locations on the LCD. In particular, the asymmetry redirects light from the center to the edges of the panel, and also redirects illumination from outside of the LCD boundary to within. This latter aspect not only makes illumination of the LCD more uniform, it makes it more intense and increases overall system efficiency. The condenser asymmetry can be corrected by a corresponding corrective asymmetry in the collimating optic adjacent the LCD stage, if desired. (For example, a Fresnel doublet can be used, composed of crossed cylinder lenses, the combination of which behaves as a rectangular, or "toric," lens.)

The foregoing and additional features and advantages of the present invention will be more readily apparent from the following detailed description, which proceeds with reference to the accompanying drawings.

DETAILED DESCRIPTION

Figure 1:
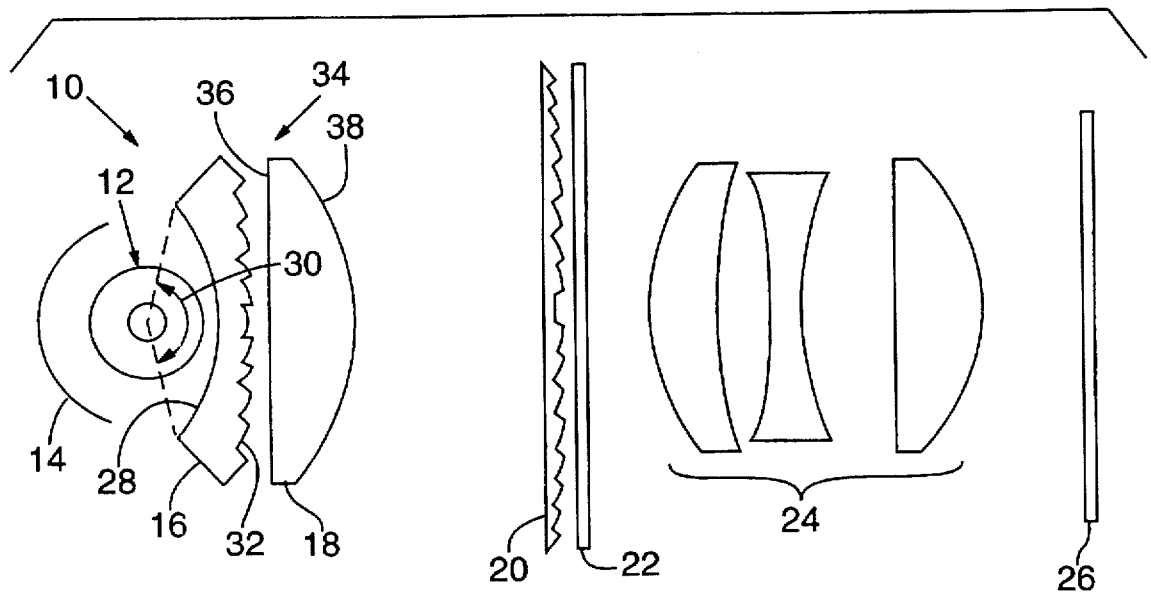
FIG. 1 is a schematic view of a projection system according to one embodiment of the present invention.

Referring to FIG. 1, a projection system 10 according to one embodiment of the present invention includes a light source 12, a reflector 14, a Fresnel-meniscus lens 16 (the "collection lens"), a condenser lens 18, a collimation lens 20, an image medium or LCD stage 22, a projection lens 24, and a screen 26. These elements are conventional components of the classic Köhler projection system, with the exception of the lenses 16, 20, and a modification to lens 18. It should be noted that the drawing is not to scale. In particular, the collimation lens, the LCD stage 22 and the screen 26 are substantially larger than the other components.

Fresnel-meniscus lens 16 has a first concave surface 28 that "wraps-around" the light source 12 so as to maximize the amount of intercepted light. In the preferred embodiment, surface 28 is aspheric and subtends an arc 30 of at least 140 degrees relative to the center of the light source 12. In other embodiments, larger (e.g. 160° or more) or smaller arcs 30 can be subtended.

The second surface 32 of the Fresnel-meniscus lens 16 is a convex lens in Fresnel form. In the illustrated embodiment, facet spacing of 0.1 inch is used, although other spacing could of course be employed.

Due to thermal requirements, lens 16 is desirably made of tempered glass. Molded glass can be used, but machined glass is considered preferable in order to achieve best definition of the Fresnel lens surface 32. In the preferred embodiment, the tempering is performed after the machining.

Adjacent the Fresnel-meniscus lens 16 is a condenser lens 18. (Together, these two lenses are sometimes referred to as the condenser lens assembly 34.) The condenser lens further refracts the light exiting the Fresnel-meniscus lens to illuminate the LCD stage 22. In the illustrated embodiment, the first surface 36 of the condenser lens 18 is planar, and the second surface 38 is aspheric.

It will be recognized that the refractive power of the condenser lens assembly 34 is spread over four lens surfaces, thereby limiting the refraction at any surface and avoiding total internal reflection (TIR).

As noted earlier, less illumination is provided at the periphery of the LCD stage 22 than at the center due to the decrease of the light with distance (proportional to the square of the path length). To alleviate this problem, the lens assembly 34 is desirably non-rotationally symmetric (i.e. asymmetric) so that illumination of the LCD is made more uniform and intense. In particular, asymmetry can be provided to redirect light from the center of the stage towards the edges—making the LCD illumination more uniform. Additional asymmetry can be provided to redirect light that would otherwise fall outside the LCD boundary to instead fall inside—making the LCD illumination more intense. In the illustrated embodiment, such asymmetry is provided in the Fresnel-meniscus lens 16 and is tailored as desired by designing the Fresnel facets/risers accordingly (detailed more particularly in connection with FIGS. 6 and 7, below).

Figure 2A:
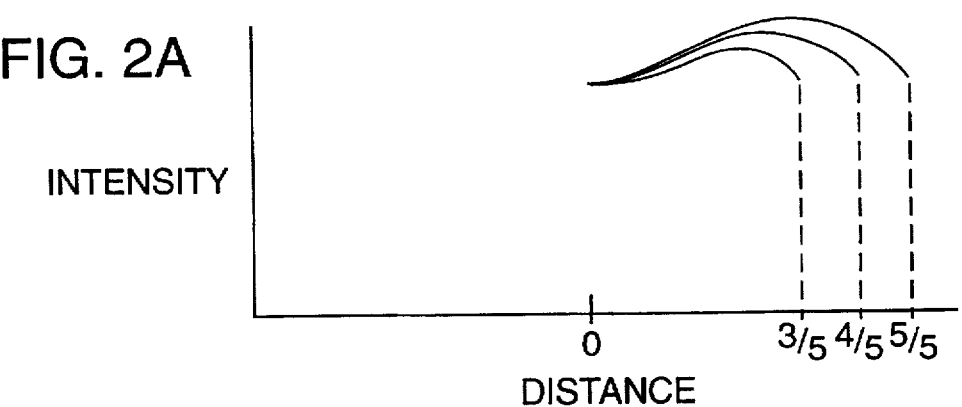
FIGS. 2A and 2B illustrate the relative distribution of illumination across the image plane in embodiments employing differing asymmetries.

FIG. 2A shows this asymmetry in light distribution. The three lines show the cross sectional intensity distributions in the vertical (3/5), horizonal (4/5) and diagonal (5/5) directions (assuming an aspect ratio of 4:3). Non-rotational symmetry is observed in the three cross sectional intensity distributions.

Uniform distribution of light across the image plane may not result in uniform distribution across the final image. Lambert's law states that the brightness decreases because the area of the source appears to get smaller when viewed from off-axis, and that as smaller angles are subtended, there is a $COS^2$ fall-off of intensity. When a projection system is analyzed, it will be recognized that a $COS^4$ power is obtained through the lens onto the screen because of this fundamental mechanism, resulting in poor center-to-corner intensity ratios.

To rectify this non-uniformity in screen illumination, the illumination of the peripheral portion can be pre-emphasized at the LCD stage by appropriate design of the condenser lens assembly. This increased illumination is attenuated in transmission to the remote screen so that the final illumination is uniform across the screen.

Figure 2B:
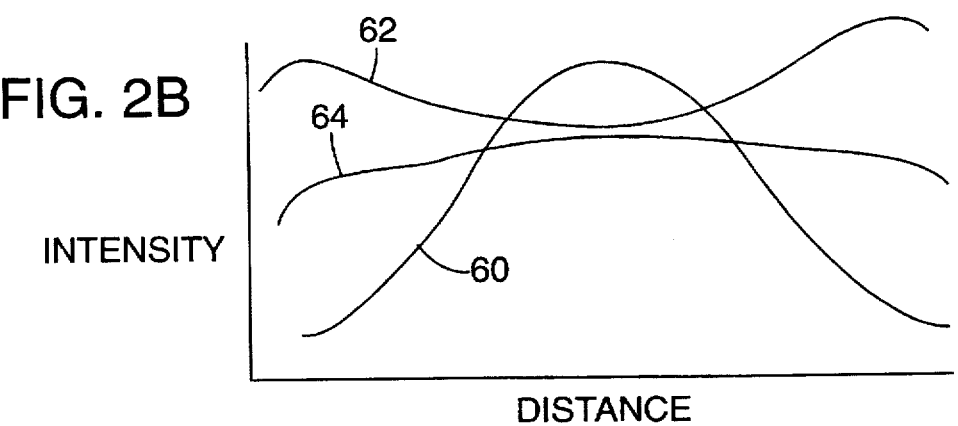

FIG. 2B shows, by curve 60, the intensity distribution of a typical projector, using an aspheric condenser. Curve 62 shows the pre-emphasized intensity distribution needed at the image plane in order to achieve the desired uniform distribution (curve 64) at the screen.

It will be recognized that the asymmetry provided by lens 16 may interfere with the collimation of light at the LCD stage 22. In such case, the collimation lens 20 can be provided with a corresponding corrective asymmetry. As noted, stacked LCD displays require highly collimated illumination in order to avoid parallax effects. Accordingly, the correction lens 20 provides a corrective asymmetry so as to assure collimated illumination of the image medium. This correction lens 20 takes the form of a plastic molded Fresnel lens in the preferred embodiment.

The light source 12 can be a spiral-wound tungsten filament (e.g. halogen) lamp, or arc (e.g. metal halide) lamp.

Figure 3:
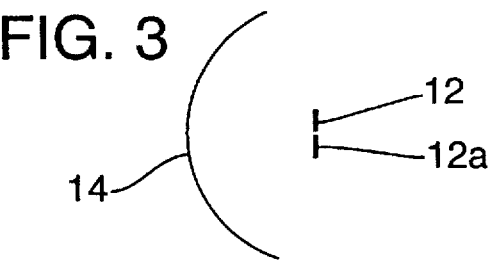
FIG. 3 is a view showing placement of the light source relative to the reflector.

Desirably, the source provides radially symmetric light distribution. In the preferred embodiment, the light source 12 is positioned slightly off-center in the reflector 14, as shown in FIG. 3. The reflector images a second light source 12a in the plane of the real one, displaced an equal and opposite distance from the center. Together, the real and imaged light sources provide the illumination for the ensuing series of lenses.

It will be understood from the foregoing that the illustrated reflector 14 is of spherical shape. The reflector can be arbitrarily sized, and is desirably positioned to subtend at least the same angle as the Fresnel-meniscus lens 16.

Desirably, the light source 12 is placed as close to the lens 16 as thermal considerations will allow. This affords many advantages. One is that the lens 16 intercepts more light for a fixed lens size. Another is that the imaging degradation commonly associated with Fresnel optics is minimized.

Figure 4:
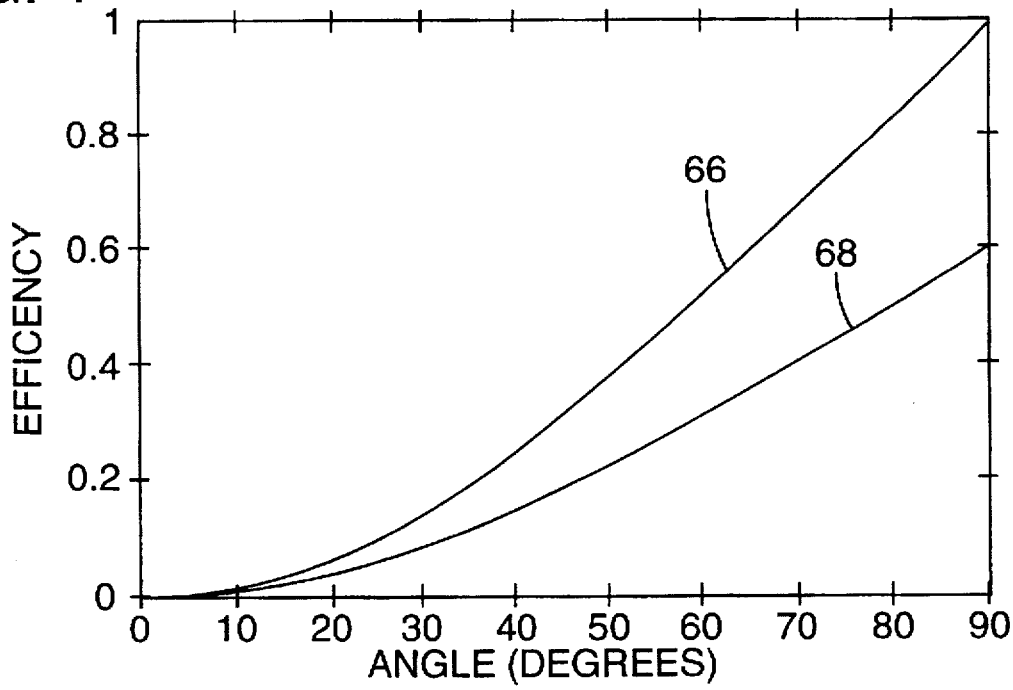
FIG. 4 is a graph showing collection efficiency as a function of the angle subtended by the collection lens.

FIG. 4 is a graph showing light collection (percentage of a hemisphere) as a function of the angle subtended by the lens. Curve 66 shows collection for a solid angle, while curve 68 shows collection assuming a rectangular image plane with a 4:3 aspect ratio.

As can be seen from FIG. 4, relatively modest increases in the angle subtended by the collection lens can result in relatively significant increases in efficiency. For example, subtending a half-angle of 45° collects 29% of the hemispherical light, while subtending a half-angle of 70° more than doubles the collected light (i.e. to 66%).

Figure 5:
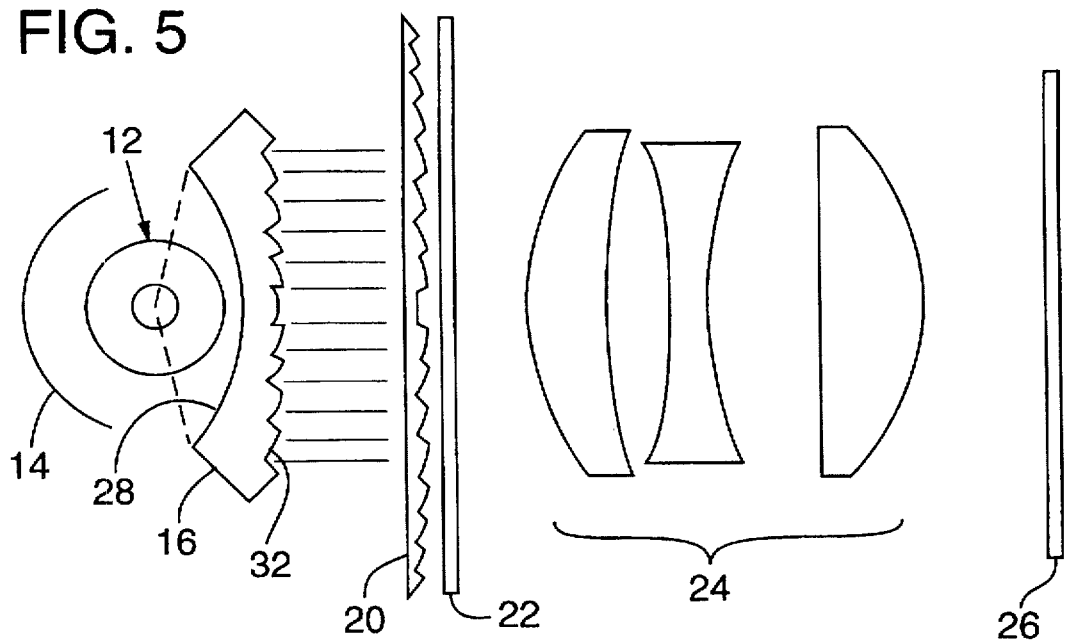
FIG. 5 is a schematic view of a projection system according to a second embodiment of the invention which illustrates, in exaggerated form, aspheric concentration.

FIG. 5 shows a second, generally preferable, projection illumination system 50 that uses just a single Fresnel-meniscus lens 52 in the condenser assembly 34. This figure also illustrates the concentration of the light away from the center of the image plane to correct for illumination non-uniformity due to path length differences. As noted, the collimation of these non-parallel light rays is provided by the correction lens 20.

Contrary to conventional wisdom, the present inventor has found it is desirable to reduce the apparent magnification of the light source. (Conventional wisdom holds that magnification of the source should be increased in order to provide more brightness. The present inventor does not disagree with this per se, but instead seeks to magnify the source as little as possible while subtending more of the hemisphere radiating from it, so the total lumens onto the object is maximized with the least apparent magnification. The "wrap-around" shape of the collection lens achieves these objectives; its concavity permits the distance between the light source and the lens' principal plane to be reduced, thereby reducing magnification and increasing collection. The implementation of the convex lens on the opposite side in Fresnel form also contributes to reduced magnification, since it too tends to reduce the distance between the principal plane of the collection lens and the light source. (In the preferred embodiment, this distance is 2.5 centimeters or less.)

Figure 6A:
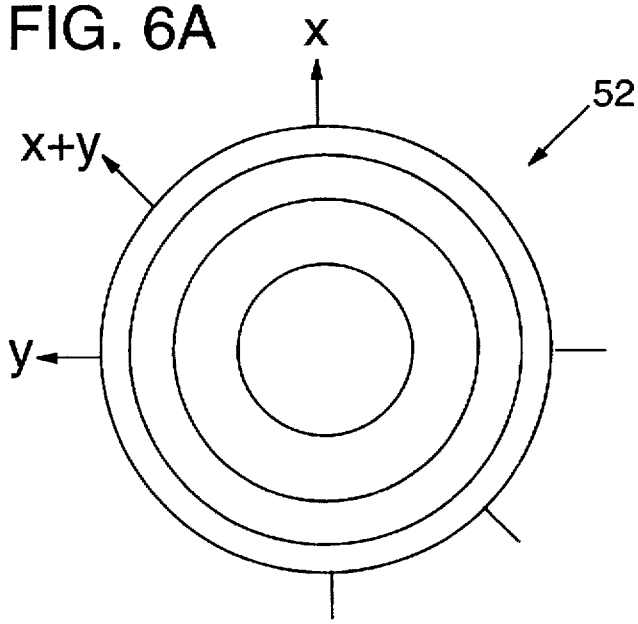
FIG. 6A is a plan view.
Figure 6B:
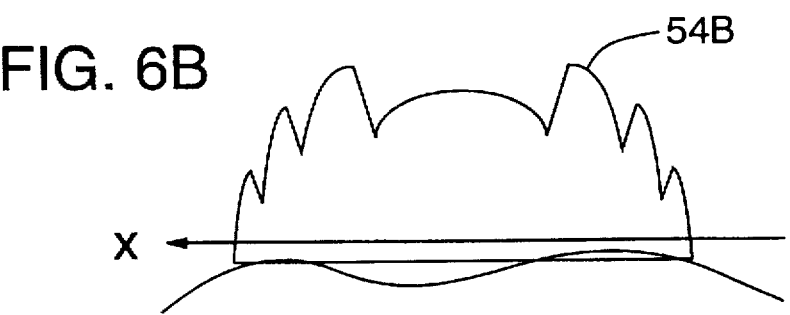
FIGS. 6B–D are partial sectional views, of an asymmetric collection lens used in the FIG. 5 embodiment of the invention.
Figure 6C:
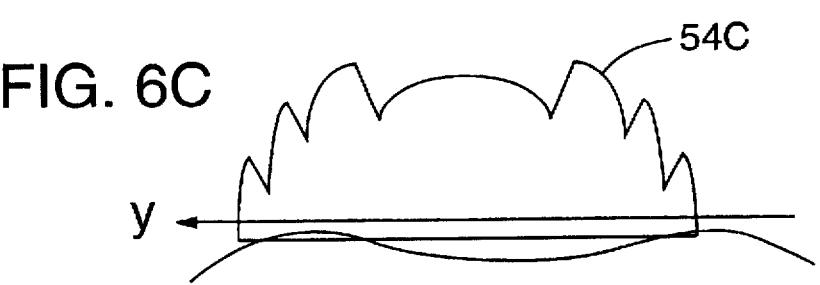
Figure 6D:
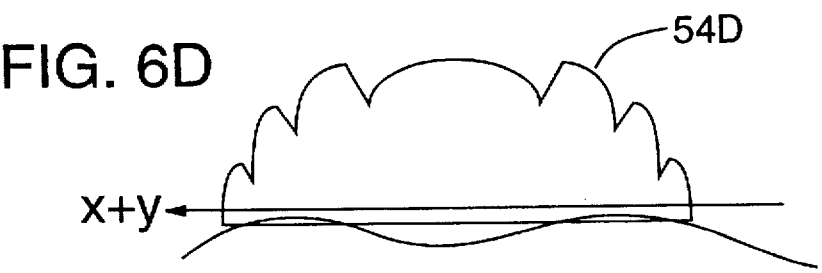

FIG. 6A is a simplified plan view showing the Fresnel surface on the lens 52 of FIG. 5. FIGS. 6B–D detail how the asymmetry of this Fresnel lens is realized. As can be seen, the facets or active lens edges 54B in the "X" direction (FIG. 6B) are "steeper" than the active lens edges 54C in the "Y" direction (FIG. 6C). The active lens edges 54D in the diagonal "X+Y" direction (FIG. 6D) have the least steepness, since they need to bend the diverging rays from the light source the least to get them to the corners of the rectangular image area. Note that in this preferred embodiment, the lens' asymmetrical effect is achieved while still maintaining the circular shape of the Fresnel rings (FIG. 6A).

Figure 7A:
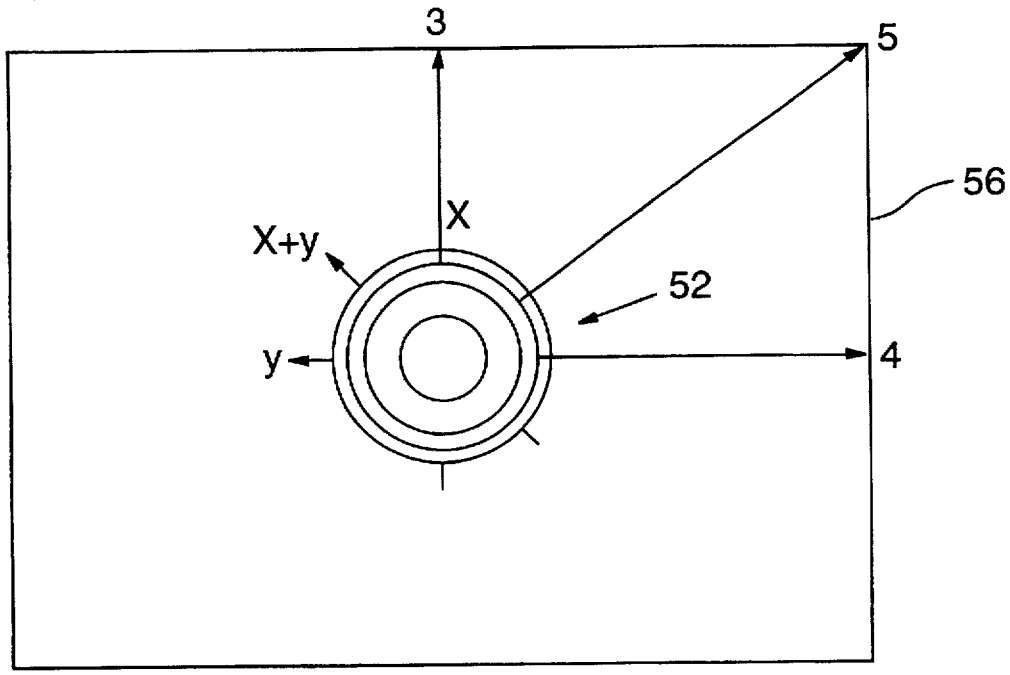
FIGS. 7A–B illustrate how the collection lens of FIGS. 6A–D serves to uniformly distribute light across the rectangular area of the image plane.
Figure 7B:
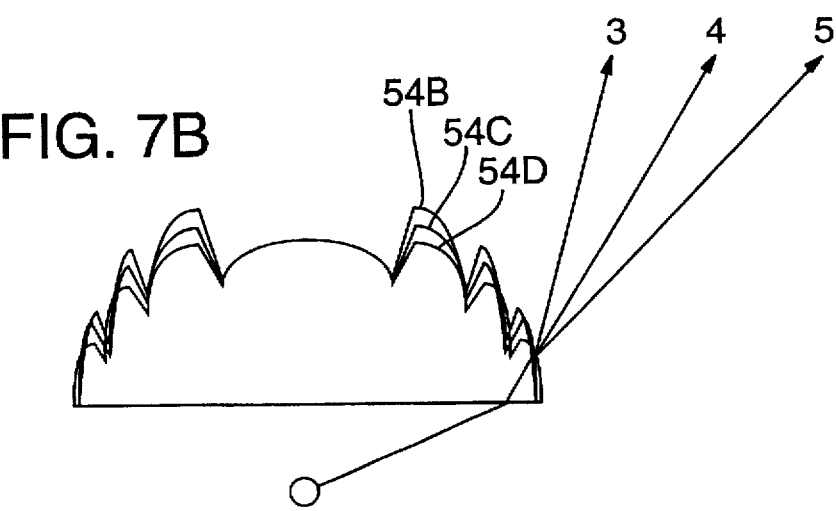

FIGS. 7A and 7B illustrate how the asymmetry of lens 52 refracts the light so as to achieve more uniform illumination across the rectangular image area. FIG. 7A shows the rectangular shape of the image plane 56, and the different dimensions across which light must be directed. FIG. 7B shows the three lens cross sections of FIGS. 6B–D superimposed, and the refraction due to each.

As can be seen from FIG. 7A, in the narrowest dimension ("X") of the image area (i.e. its height), the light 3 must be "pulled in" (i.e. refracted) the most. This is achieved by providing the steepest lens edges 54B (FIG. 7B) in this direction. In the largest dimension ("XY") of the image area, the light 5 must be refracted the least. This is achieved by providing the least steep edges 54D in this direction. Finally, in directions having intermediate dimensions, such as dimension "Y" (i.e. the width of the image area), the light 4 is refracted an intermediate amount. By this arrangement, the hemisphere of light emitted from source is refracted to conform to and fill the rectangular area of the image.

From the foregoing, it will be recognized that the illustrated embodiments of the present invention advantageously solve many of the problems associated with the prior art. In particular, the illustrated systems more nearly approximate a point source optical system, with attendant advantages such as improved collimation, reduced projection lens size, and greater depth of field. The condenser lens assemblies also provide brighter, more uniform illumination of the LCD stage. This efficiency permits a smaller light source to be used than in other LCD projectors, further enhancing the collimation, projection lens size, and depth of field advantages. This, in turn, reduces the heat problems traditionally associated with LCD projectors, with an attendant reduction in system cost and complexity. Safety is also enhanced by use of small lamps as compared with the large, hot, high-pressure arc-lamps generally required in the prior art.

It will also be recognized that this approach is counter-intuitive in many respects. For example, the use of a Fresnel lens in this application defies traditional logic since Fresnel lenses degrade imaging quality. (This drawback is here addressed by positioning the lens very close to the light source so the lens' degrading effects are minimized. Further, the Fresnel facets serve to homogenize the light at the object, since there is some overlap between rays going through each facet, given a light source of any real size.) The aim of reduced source magnification is also contrary to teachings of the prior art.

Figure 8:
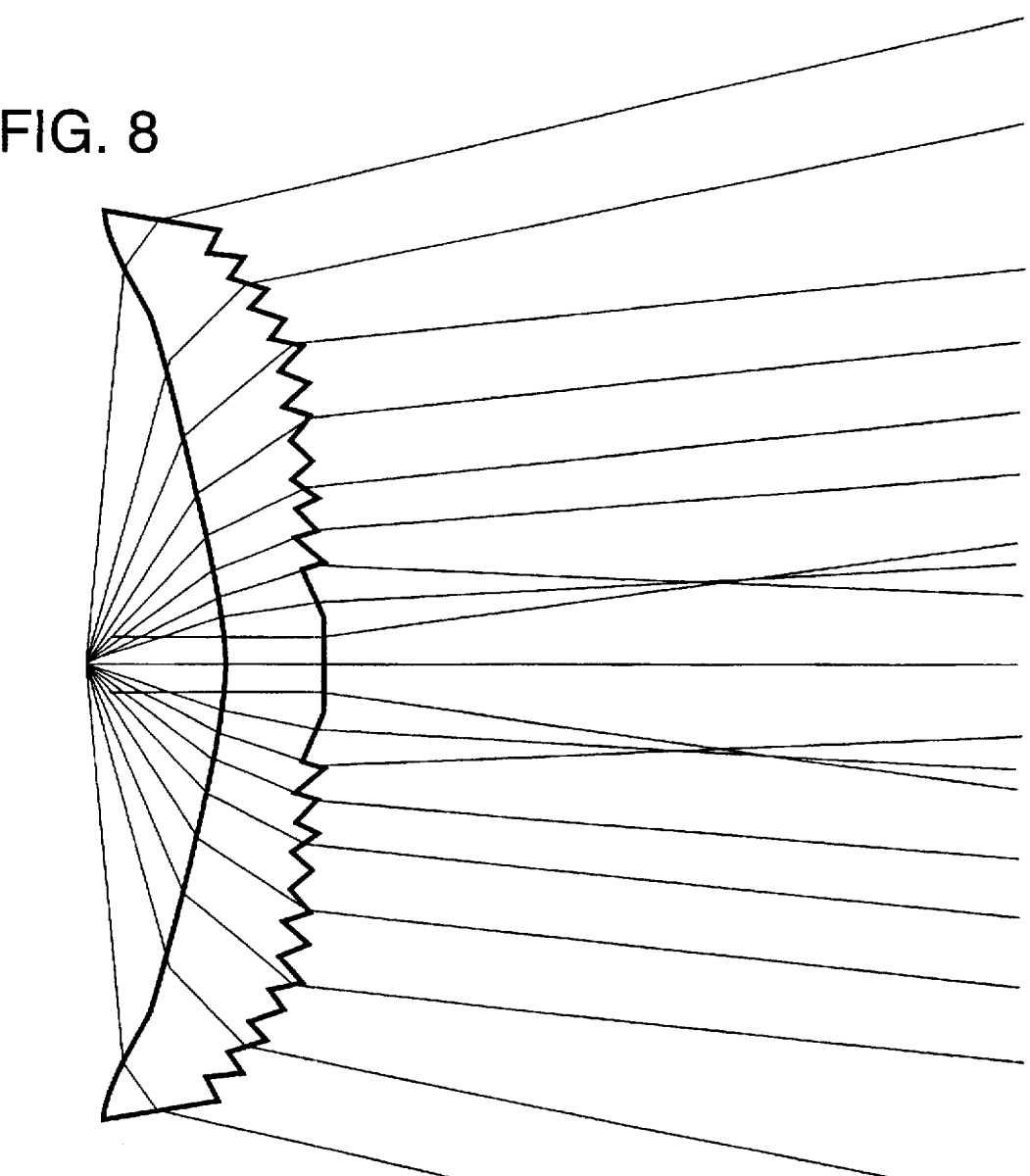
FIG. 8 shows a Fresnel lens fashioned on a curved surface (a Fresnel meniscus lens).
Figure 9:
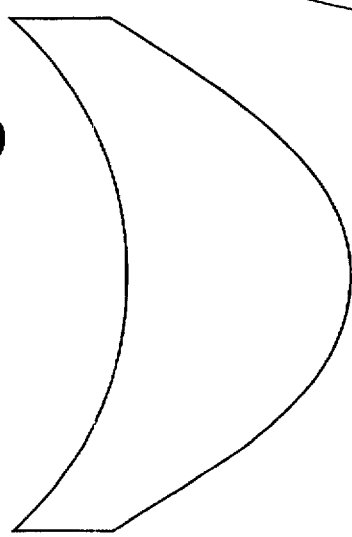
FIG. 9 shows an alternative collection lens made of high index material.

Having described and illustrated the principles of our invention with reference to various illustrative embodiments, it will be apparent that the detailed embodiments can be modified in arrangement and detail without departing from such principles. For example, while the invention has been illustrated with reference to embodiments in which the Fresnel lens is formed on a generally planar surface of the collection lens, in other embodiments the Fresnel side of the lens can be of generally curved shape, as shown in FIG. 8. (The FIG. 8 lens has nearly hemispheric collection.) Further, while the invention has been illustrated with reference to embodiments that make use of a Fresnel lens, in other embodiments many of the same advantages can be achieved by use of a meniscus collection lens having a very high index of refraction (i.e. in excess of 1.8), as shown in FIG. 9. One such material is Schott glass type LaSF9 (Schott Corp., Duryea, Pa.), which has an index of 1.85. Another such material is pressed zinc sulfide, which has a refractive index of 2.35. Such lenses can be fashioned with spherical surfaces, although other configurations can alternatively be used.

In still other embodiments, asymmetry can be provided by lens surfaces other than the illustrated Fresnel surfaces. The side of the collection lens adjacent the lamp, for example, can provide asymmetry, e.g. by use of a toric shape.

In view of the wide variety of embodiments to which the principles of my invention can be applied, it should be apparent that the detailed embodiments are illustrative only and should not be taken as limiting the scope of my invention. Rather, we claim as our invention all such modifications as may come within the scope and spirit of the following claims and equivalents thereto.

The invention claimed is:

1. A collection lens adapted to project light from a light source placed to the rear of the collection lens onto a projection surface placed in front of the collection lens and comprising:

a front surface, having a plurality of rotationally asymmetric substantially concentric facets and risers therein defining a Fresnel convex lens having refractive power that is rotationally asymmetric about the lens for introducing a rotational asymmetry into the projected light to effect the substantially even illumination of a predetermined rectangular area on the projection surface; and a rear surface having a concave shape.

2. The lens of claim 1 in which the front surface is generally flat in gross.

3. The lens of claim 1 in which the front surface has a generally curved shape.

4. The lens of claim 1 in which the rear surface is aspheric.

5. The collection lens of claim 1 in which the predetermined rectangular area has a 4:3 aspect ratio.

6. The collection lens of claim 1 in which the asymmetric concentric risers that are intersected by an optical plane defined perpendicular to the projection surface and intersecting the predetermined rectangular area on the projection surface diagonally are shorter than the concentric risers that are intersected by a plane defined perpendicular to the projection surface and intersecting the predetermined rectangular area on the projection surface horizontally.

7. A high efficiency projection system for projecting light onto a projection surface which includes:

a transparent collection lens defining front and rear surfaces, the rear surface having a concave shape; and a light source positioned adjacent the rear surface of the collection lens, the light source being positioned relative to the collection lens so that the rear surface of the collection lens subtends an arc of at least 140 degrees relative to the center of the light source.

8. The projection system of claim 7 in which the light source is positioned relative to the collection lens so that the rear surface of the collection lens subtends an arc of at least 150 degrees relative to the center of the light source.

9. The projection system of claim 7 in which the light source is positioned relative to the collection lens so that the rear surface of the collection lens subtends an arc of at least 160 degrees relative to the center of the light source.

10. The projection system of claim 7 which further includes an aspheric condenser lens adjacent the front side of the collection lens.

11. The projection system of claim 7 further including a collimating optic having an asymmetry that corresponds inversely to the asymmetry of the asymmetric concentric facets and risers and thereby corrects the asymmetry of the projected light.

12. The projection system of claim 7, in which the front surface of the transparent collection lens has a plurality of rotationally asymmetric substantially concentric facets and risers thereon defining a Fresnel convex lens having refractive power that is rotationally asymmetric about the lens for introducing a rotational asymmetry into the projected light to effect the substantially even illumination of a predetermined rectangular area on the projection surface.

13. The high efficiency projection system of claim 7, in which the collection lens is positioned so that an effective principal plane of the collection lens is not more than 2.5 cm from the center of the light source.

14. The high efficiency projection system of claim 7, in which the rear surface of the collection lens is aspheric.

15. The high efficiency projection system of claim 7, in which the rear surface of the collection lens is in the shape of a toric.

16. In a projector including a light source, a collection lens having a concave surface and an image plane, an improved projection method including positioning the collection lens so that the concave surface is facing the light source and so that an effective principal plane of the collection lens is not more than 2.5 cm from the center of the light source so that the collection lens intercepts at least 140° of diverging illumination from the light source, and minimizing apparent magnification of the light source to the image plane.

17. The method of claim 16 in which the minimizing step includes providing a Fresnel-meniscus lens for the collection lens.

18. The method of claim 16 in which the minimizing step includes providing a meniscus lens formed of a material with a refractive index in excess of 2.0 for the collection lens.

19. The method of claim 16 in which the minimizing step includes providing a meniscus lens formed of a material with a refractive index in excess of 1.8 for the collection lens.

20. The method of claim 18 in which the minimizing step includes providing a meniscus lens formed of zinc sulfide.

21. The method of claim 16 in which the collection lens is positioned so that it intercepts 150° of diverging illumination from the light source.

22. The method of claim 16 in which the collection lens is positioned so that it intercepts 160° of diverging illumination from the light source.

* * * * *

UNITED STATES PATENT AND TRADEMARK OFFICE
CERTIFICATE OF CORRECTION

PATENT NO : 5,742,438

DATED : April 21, 1998

INVENTOR(S): Arlie R. Conner, Jonathan R. Biles, and David K. Booth

It is certified that error appears in the above-identified patent and that said Letters Patent are hereby corrected as shown below:

Column 5, line 44, "magnification." should read --magnification).--.

Claim 9, column 7, line 57, "are" should read --arc--.

Signed and Sealed this

Twenty-ninth Day of May, 2001

Attest:

NICHOLAS P. GODICI

*Attesting Officer*  *Acting Director of the United States Patent and Trademark Office*